US012776302B2

(12) United States Patent
Shin

(10) Patent No.: US 12,776,302 B2
(45) Date of Patent: Oct. 27, 2026

(54) USING HIERARCHICAL MIXTURE-OF-EXPERTS LANGUAGE MODELS WITH MICROPHONE FIDELITY ROUTING

(71) Applicant: GOOGLE LLC, Mountain View, CA (US)

(72) Inventor: Dongeek Shin, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 155 days.

(21) Appl. No.: 18/933,743

(22) Filed: Oct. 31, 2024

(65) Prior Publication Data

US 2026/0120681 A1 Apr. 30, 2026

(51) Int. Cl.
*G10L 15/16* (2006.01)
*G10L 15/02* (2006.01)
*G10L 15/26* (2006.01)
*G10L 25/30* (2013.01)

(52) U.S. Cl.
CPC .............. *G10L 15/02* (2013.01); *G10L 15/26* (2013.01); *G10L 25/30* (2013.01)

(58) Field of Classification Search
CPC ......... G10L 15/02; G10L 15/26; G10L 25/30; G10L 15/20
See application file for complete search history.

(56) References Cited

U.S. PATENT DOCUMENTS

2023/0376697 A1 11/2023 Chow et al.
2024/0135176 A1 4/2024 Meng
2024/0169463 A1* 5/2024 Xiong ...................... G06T 1/20
2026/0037774 A1* 2/2026 Ehteshami Bejnordi .................... G06N 3/045

OTHER PUBLICATIONS

Naveed et al., "A Comprehensive Overview of Large Language Models" arXiv:2307.06435v9 [cs.CL] 46 pages, dated Apr. 9, 2024.
Nikhil Goel "Mixture of Experts (MOE) and its application in Large Language Models" Retrieved from https://www.linkedin.com/pulse/mixture-experts-moe-its-application-large-language-models-nikhil-goel-rcrfc. 7 pages, dated Jan. 26, 2024.

(Continued)

*Primary Examiner* — Abul K Azad
(74) *Attorney, Agent, or Firm* — Gray Ice Higdon

(57) ABSTRACT

Implementations relate to leveraging a generative model to process a transcript of user speech and a spectrogram that reflects audible features of audio data capturing the user speech, to generate a response. The generative model can include a Mixture-of-Experts (MoE) subnetwork and a gating subnetwork. The MoE subnetwork can include multiple expert models trained (e.g., fine-tuned) respectively based on content recognized from audio data corresponding to different ranges of signal-to-noise ratios. The gating subnetwork can be trained to select a subset of expert models from the multiple expert models based on the spectrogram that reflects the audible features (e.g., SNR ratios) of the audio data. The gating subnetwork can further be used to determine a gating weight for each expert model from the selected subset, and expert output from each can be combined with a corresponding gating weight, to generate a MoE layer output that reflects a response.

20 Claims, 9 Drawing Sheets

(56) References Cited

OTHER PUBLICATIONS

"Mixture of Experts Approach for Large Language Models" Retrieved from https://toloka.ai/blog/mixture-of-experts-approach-for-llms, 11 pages, dated Mar. 19, 2024.
Aayush Mittal "The Rise of Mixture-of-Experts for Efficient Large Language Models" Unite. AI. Retrieved from https://www.unite.ai/the-rise-of-mixture-of-experts-for-efficient-large-language-models. 8 pages, dated Apr. 23, 2024.

* cited by examiner

USING HIERARCHICAL MIXTURE-OF-EXPERTS LANGUAGE MODELS WITH MICROPHONE FIDELITY ROUTING

BACKGROUND

Generative models (e.g., language models, such as a large language model, "LLM") have been a driving force behind many recent advancements in areas such as image processing and natural language processing (NLP).

For example, a typed input can be processed using a generative model, to generate output reflecting content which is responsive to the typed input. As another example, natural language content recognized from an audible input (e.g., "could you explain general relativity") can be processed using a generative model, to generate model output reflecting content (e.g., "General relativity is the geometric theory of gravitation published in 1915 . . . ") that is responsive to the audible input.

However, in a noisy environment, the natural language content recognized from the audible input can be inaccurate. As a result, the content that is derived from the model output based on such natural language content can be of degraded quality (e.g., not responsive to the audible input). Moreover, to handle complex or sophisticated tasks (e.g., specified in a user input or query), generative models can include billions of parameters, tens of billions of parameters, or even more. As the sizes of the generative models grow to accommodate handling of increasingly complicated tasks, the computational resources and requirements for training and inference stages of those generative models can be demanding. This restricts deployment of generative models at client devices, pushes against the limits of hardware resources and other resources, and/or results in relatively high end-to-end latency.

SUMMARY

Various implementations disclosed herein relate to leveraging audible features determined from audio data that captures user speech (e.g., a query), as well as a speech recognition ("transcript") of the user speech, to generate a response using a machine learning (ML) model. In some of the various implementations, the ML model can be a language model. In some of the various implementations, the ML model can be a multi-layer neural network that at least includes a Mixture-of-Experts (MoE) layer. In some of the various implementations, the ML model can further include a first neural network layer and/or a second neural network layer, where the MoE layer is between the first neural network layer and the second neural network layer. In some of the various implementations, the MoE layer can include a MoE subnetwork having multiple expert models. In some of the various implementations, the MoE layer can further include a gating subnetwork.

In some of the various implementations, a first neural network layer output generated by the first neural network layer (e.g., based on processing the speech recognition of the user speech) can be processed using a subset of expert models selected from the multiple expert models that are included in the MoE subnetwork. In some of the various implementations, the subset of expert models can be selected using the gating subnetwork based on the audible features determined from the audio data that captures the user speech (and/or based on the speech recognition of the user speech). In some of the various implementations, the audible features can indicate a range of signal-to-noise ratios (SNR) associated with the audio data capturing the user speech. Different subsets of expert models can be selected using the gating subnetwork for audio data having different ranges of SNRs. It is noted that, in some implementations, a MoE-based language model can differ from a traditional transformer-based language model by replacing a feed-forward network (FFN) layer in the traditional transformer-based language model with an MoE layer that includes a gating subnetwork and an MoE subnetwork (having multiple expert models).

In some of the various implementations, the multiple expert models can be trained (e.g., fine-tuned) to respectively process tokens that are derived natural language content recognized from audio data having different ranges of SNRs. For instance, the multiple expert models can include a first expert model fine-tuned to process tokens representing content derived from audio data having a first range of SNRs, a second expert model fine-tuned to process tokens representing content derived from audio data having a second range of SNRs, a third expert model fine-tuned to process tokens representing content derived from audio data having a third range of SNRs, . . . , and an eighth expert model fine-tuned to process tokens representing content derived from audio data having an eighth range of SNRs, where the first, second, third, . . . , and eighth ranges can be different from each other. It is noted that, the total number of multiple expert models is not limited to "8", and can be any other applicable number such as 2, 3, 4, 10, 12, 15, or even 2048.

By loading all the multiple expert models as part of the ML model into memory of a client device or a server device and by selecting a subset of the multiple expert models during the inference stage to process the first neural network layer output from the first neural network layer, latency and consumption of resources in generating a response responsive to the user speech/input can be reduced compared to processing the user speech using a different model having the same number of parameters as the ML model disclosed herein. Further, by fine-tuning the multiple expert models to handle processing of input (e.g., tokens) determined from audio data having different ranges of noises (or SNRs) and selecting the subset of multiple expert models to handle an audible user input based on a noise level associated with the audible user input, the accuracy and/or quality of the response generated in response to the audible user input can be enhanced.

In various implementations, a method implemented using one or more processors is provided. The method includes: receiving audio data capturing user speech; processing the audio data to determine a speech recognition of the user speech and audible features of the audio data capturing the user speech; and processing the speech recognition of the user speech and the audible features of the audio data using a neural network having at least a gating subnetwork and a mixture-of-experts (MoE) subnetwork that includes multiple expert models.

In some of the various implementations, processing the speech recognition of the user speech and the audible features of the audio data can include: selecting a subset of expert models from the multiple expert models in the MoE subnetwork based on processing the audible features of the audio data using the gating subnetwork; processing a tokenized representation derived from the speech recognition of the user speech, using the subset of expert models selected based on the audible features, to generate a model output;

and processing the model output to generate a response responsive to the user speech.

In various implementations, the method can further include: causing the response to be rendered in response to the user speech.

In some of the various implementations, processing the audio data to determine a speech recognition of the user speech and audible features of the audio data capturing the user speech can include: processing the audio data, using an automatic speech recognition (ASR) engine, to determine the speech recognition of the user speech; and processing the audio data to generate a spectrogram reflecting the audible features of the audio data.

In some of the various implementations, the audible features of the audio data reflect a signal-to-noise (SNR) ratio (or a range of SNR ratios) for the audio data. In some of the various implementations, the gating subnetwork is trained or fine-tuned to select the subset of expert models based on the SNR ratio(s) for the audio data.

In some of the various implementations, processing the speech recognition of the user speech and the audible features of the audio data using the neural network further can include: calculating one or more gating weights based on processing the audible features of the audio data using the gating subnetwork. In some of the various implementations, processing the tokenized representation derived from the speech recognition of the user speech, using the subset of expert models selected based on the audible features, to generate the model output can include: processing the tokenized representation derived from the speech recognition of the user speech, respectively, using the selected subset of expert models, to generate one or more corresponding expert outputs; and determining the model output based on the one or more calculated gating weights and the one or more expert outputs.

In some of the various implementations, the multiple expert models include a first expert model trained or fine-tuned to process content derived from first audio data having a first range of signal-to-noise (SNR) ratio, and a second expert model trained or fine-tuned to process content derived from second audio data having a second range of SNR ratio, wherein the first expert model is different from the second expert model, and wherein the first range of SNR ratio is different from the second range of SNR ratio. In some of the various implementations, selecting the subset of expert models from the multiple expert models in the MoE subnetwork based on processing the audible features of the audio data using the gating subnetwork can include: selecting the first expert model without selecting the second expert model in response to determining, based on the audible features of the audio data, that the audio data having a SNR ratio corresponding to the first range; and selecting the second expert model without selecting the first expert model in response to determining, based on the audible features of the audio data, that the audio data having a SNR ratio corresponding to the second range.

The preceding is presented as an overview of only some implementations disclosed herein. These and other implementations are disclosed in additional detail later in this disclosure. By leveraging (e.g., training, fine-tuning, or prompt engineering, etc.) a generative model having a MoE subnetwork to generate a response for user speech, computational resources associated with processing of a speech recognition of the user speech can be reserved as a subset of expert models (instead of all expert models) are selected from the MoE subnetwork for processing of the speech recognition. Further, the expert models can be respectively trained (or fine-tuned) based on audible features (e.g., SNR ratios) of different user speeches, and the gating subnetwork can be trained (or fine-tuned) to select the subset of expert models. The response for the user speech generated in this way can have an enhanced accuracy while computational resources associated with processing of the speech recognition of the user speech are reduced.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

DETAILED DESCRIPTION

Figure 1:
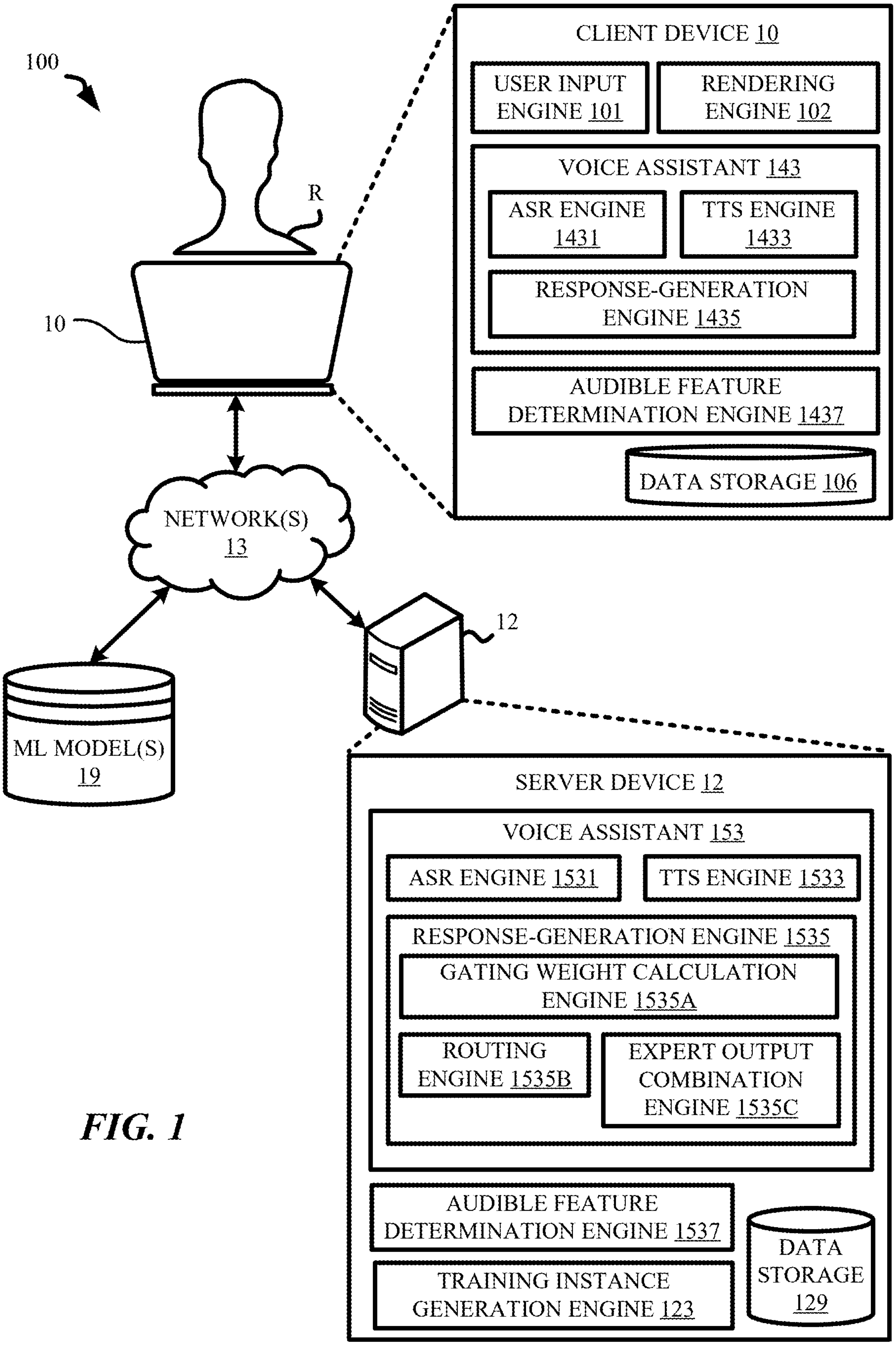
FIG. 1 depicts a block diagram of an example environment that demonstrates various aspects of the present disclosure, and in which some implementations disclosed herein can be implemented.

In a noisy environment, natural language content recognized by, e.g., automatic speech recognition (ASR) module based on processing of audio data capturing user speech can be inaccurate. As a result, model output determined based on processing such inaccurately recognized natural language content (e.g., using one or more machine learning (ML) models) may lead to content that does not accurately respond to the user speech (e.g., that does not respond to the user speech at all). This can result in a user repeatedly providing utterances with the same content, which requires processing of each of the repeatedly provided utterances. Such extended human-to-computer interactions caused by the extensive processing of the repeatedly provided utterance can lead to extended consumption of computational resources, battery resources, and/or network resources that are needed to perform the extended human-to-computer interactions, in order to provide a satisfying response.

In some cases, even with extended human-to-computer interactions performed, existing techniques may still bear the risk that no response accurately or fully responds to the user speech is derived. Accordingly, to optimize utilization of resources and without increasing computational complexity, techniques described herein provide mixture-of-experts-based ("MoE-based") methods and systems for dynamically generating responses for audible input received in different environments. For example, a system can be provided, where the system can include an automatic speech recognition (ASR) engine that recognizes natural language content from audio data capturing user speech. The system can further include a machine learning (ML) model and include engine(s) for determining audible features (e.g., a spectrogram) associated with the user speech.

The ML model can include a neural network. For instance, the ML model can be a single neural network. The neural network can include a MoE subnetwork and/or a gating subnetwork. The gating subnetwork and the MoE subnetwork may collectively be referred to as a "MoE layer". The MoE subnetwork can include multiple expert models having different configurations (e.g., different amount of parameters, etc.). The audible features of the user speech can be processed, using the gating subnetwork, to select a subset of expert models from the multiple expert models that are included in the MoE subnetwork, and to calculate one or more gating weights to be assigned to a corresponding expert output from one of the selected subset of expert models, where the corresponding expert output can be generated based on processing input to the MoE subnetwork using a respective expert model from the selected subset. Based on the expert output(s) from the selected subset of expert models and the one or more gating weights respectively assigned to the expert output(s), a MoE layer model output can be determined and be processed (e.g., using one or more additional neural network layers, such as a multi-head attention layer) to generate a response. Such generated response can be rendered in response to the user speech. The response generated in this way can be more accurate and be more responsive to the user speech than response otherwise generated using existing techniques.

The following description with reference to the accompanying drawings is provided for understanding of the above-described implementation and various other implementations of the present disclosure. It's appreciated that different features from different implementations may be combined with and/or exchanged for one another. In addition, those of ordinary skill in the art will recognize that various changes and modifications of the various implementations described herein can be made without departing from the scope and spirit of the present disclosure. Descriptions of well-known or repeated functions and constructions may be omitted for clarity and conciseness.

FIG. 1 is a block diagram of an example environment 100 that demonstrates various aspects of the present disclosure, and in which implementations disclosed herein may be implemented. As shown in FIG. 1, the environment 100 can include a client computing device 10 ("client device") that is in communication with a server computing device 12 ("server device"). The client computing device 10 can be in communication with the server computing device 12, via one or more networks 13. The one or more networks 13 can include, for example, a local area network (LAN), a wide area network (WAN) such as the Internet, and/or any other appropriate network(s). In some implementations, the client computing device 10 (and/or the server computing device 12) can be in communication with one or more machine learning (ML) models 19, via the one or more networks 13.

In some implementations, the environment 100 can be an office environment, a home environment, a lab environment, or any other applicable environment, and the environment 100 can include additional client device(s) (or additional server device(s)) that connect to the one or more networks 13. In some implementations, the client computing device 10 can be, for example, a desktop computing device, a laptop computing device, a tablet computing device, a mobile phone computing device, a computing device of a vehicle (e.g., an in-vehicle entertainment system), a smart appliance (e.g., an interactive speaker), and/or a wearable apparatus that includes a computing device (e.g., glasses having a computing device, a smart watch, a virtual or augmented reality computing device), and the present disclosure is not limited thereto.

In various implementations, the client computing device 10 can include a user input engine 101 that is configured to detect user input provided by a user (e.g., user R) of the client computing device 10. The user input may be provided by the user using one or more user interface input devices, such as a keyboard, a touch screen, a microphone, etc. The user input can be typed input, touch input, audible input, or any other applicable type of input. For example, the client computing device 10 can be equipped with a keyboard to receive a typed input (e.g., "Is panther a lion"), and/or a mouse (or one or more hardware buttons) to receive a user click that selects one or more graphical user interface (GUI) elements that is rendered visually at a user interface of the client computing device 10. The typed input (e.g., "Is panther a lion") can be received, for instance, via an input field that is rendered within a graphical user interface (GUI) of the client device 10 (or, of an application such as voice assistant 143 in FIG. 1).

Additionally, or alternatively, the client computing device 10 can be equipped with one or more microphones that capture audio data, such as audio data capturing spoken utterance(s) of the user and/or other sounds in a surrounding environment of the client computing device 10. Optionally, the audio data capturing the spoken utterance(s) (e.g., "Is panther a lion?") can be received in response to a user selecting an icon indicating capturing/recording of audio data. Additionally, or alternatively, the client computing device 10 can be equipped with one or more vision components that are configured to capture vision data corresponding to images and/or movements (e.g., gestures) detected in a field of view of one or more of the vision components. Additionally, or alternatively, the client computing device 10 can be equipped with one or more touch sensitive components (e.g., a stylus, a touch screen, a touch panel, etc.) that are configured to capture signal(s) corresponding to touch input that is directed to the client computing device 10.

In various implementations, the client computing device 10 can include a rendering engine 102, and/or a data storage 106. In various implementations, the rendering engine 102 can be configured to provide content for audible and/or visual presentation to a user of the client computing device 10 using one or more user interface output devices. For example, the client computing device 10 can be equipped with one or more speakers that enable content (e.g., a notification sound) to be provided for audible presentation to the user via the client computing device 10. Additionally, or alternatively, the client computing device 10 can be equipped with a display or projector that enables content (e.g., "'panther' is a general term for cats having solidcolored coats. In Southern California, they are commonly called mountain lions.") to be provided for visual presentation to the user via the client computing device 10.

The data storage 106, and/or a data storage 129 at the server device 12, can store various types of files, folders, and/or other data. For instance, the data storage 106 of the client computing device 10 can store metadata associated with the client computing device 10, metadata associated with the user (e.g., a user profile of user R, etc.), and/or metadata associated with one or more applications stored at or accessible via the client computing device 10. Additionally, or alternatively, in some implementations, the data storage 106 (or the data storage 129) can store a plurality of training instances to train or fine-tune one or more of the ML models 19. In some implementations, the ML model(s) 19 can be, or can include, a generative model. The generative model can be, for instance, a large language model ("LLM"), a vision language model ("VLM"), a visual question answering ("VQA") model, a diffusion model, etc.

As a non-limiting example, the generative model can be a transformer-based, e.g., including (or being derived from) a transformer decoder. The transformer decoder can include, for instance, a first neural network layer (shortly as "first network layer"), a MoE layer, and/or a second neural network layer (shortly as "second network layer"). The first network layer can include, for instance, a multi-head attention mechanism. The MoE layer can include, for instance, a MoE subnetwork and/or a gating subnetwork, where the MoE subnetwork can include multiple expert models having different configurations (e.g., different amount of parameters, etc.). Based on input (e.g., first network layer output generated by the first network layer) to the MoE layer and using the gating subnetwork, a subset of expert models (e.g., a first expert model and a second expert model) can be selected from the multiple expert models, and gating weights (e.g., a first gating weight of 0.8 and a second gating weight of 0.2) can be respectively calculated (and assigned) for the selected subset of expert models.

For instance, the first gating weight of 0.8 can be assigned to first expert model output ("first expert output") from the first expert model that is selected from the multiple models, and the second gating weight of 0.2 can be assigned to second expert model output ("second expert output") from the second expert model that is selected from the multiple models. The first expert output (e.g., an intermediate embedding in the form of N-dimensional vector) can be multiplied with the first gating weight (e.g., 0.8), and be combined with the second expert output (e.g., another intermediate embedding in the form of N-dimensional vector) that is multiplied with the second gating weight (e.g., 0.2), to generate a MoE layer model output (which may or may not be a final model output that leads to a response) from which a response for the user speech is derived.

In some implementations, training (or fine tuning) of a generative model (e.g., one of the ML model(s)) can be performed through supervised learning and/or reinforcement learning. The reinforcement learning can be, for instance, reinforcement learning from human feedback ("RLHF") that incorporates human feedback into the training or fine-tuning of the LLM to align output of the LLM with human preferences. This can be implemented using a reward model trained based on human feedback. For instance, for a given user input and a plurality of responses responsive to the given user input, a human reviewer can indicate a preference (e.g., in the form of a scalar score) for each of the plurality of responses. In other words, the plurality of response for the given user input can be ranked in an order from highest human preference (indicated by a highest scalar score) to lowest human preference (indicated by a lowest scalar score). In some implementations, the scalar scores assigned by the human reviewer to the plurality of responses for the given user input can satisfy a Gaussian distribution with an average value of approximately "0", where the scalar score(s) for response(s) of higher human preference should be positive and increase with the increasing of human preference and the scalar score(s) for response(s) of lower human preference should be negative and decreases with the decreasing of human preference.

The scalar score can be applied as a reward in the RLHF process, where a large value of the scalar score indicates a higher quality of a corresponding response more preferred by the human reviewer and a lower value of the scalar score indicates a higher quality of a corresponding response that is less preferred by the human reviewer. In some implementations, such given user input and the plurality of responses responsive to the given user input can be stored in the data storage 106 (or the storage 129) as one instance for training the reward model. In some implementations, a small quantity of instances can be manually curated and/or stored in the data storage 106 (or 129), to train the reward model.

In various implementations, optionally, the aforementioned multiple expert models in the MoE subnetwork can be trained or fine-tuned, respectively, to handle content transcribed from audio data having different ranges of signal-to-noise ratios. In various implementations, the gating subnetwork can be trained or fine-tuned to select a subset of expert models based on a given spectrogram (or other audible features) that reflects a signal-to-noise (SNR) ratio, or that reflects a range of SNR ratios. Optionally, during the training or fine-tuning of the gating subnetwork, parameters of the multiple expert models in the MoE subnetwork can be frozen (e.g., keep unchanged).

In various implementations, the generative model (MoE-based, or not MoE-based) may have less than 100 billion parameters, more than 100 billion parameters, or over 200 billion parameters, etc. The greater the number of parameters of a generative model, the more complex (or sophisticated) a task (e.g., specified in a user query or request) the generative model can handle. The generative model may be stored at the client computing device 10, or at the server computing device 12. For instance, if the memory of the client computing device 10 restricts the storing of the generative model at the client computing device 10 or if a length of a textual prompt to be processed using the generative model exceeds a predetermined token length, the generative model may be stored at the server device 12. For instance, if the memory of the client computing device 10 does not restrict the storing of the generative model at the client computing device 10, the generative model may be stored at the client computing device 10, to reduce a latency in completing a task (e.g., specified in the user query or request), for instance, by avoiding data communications via the one or more networks 13.

In some implementations, when the generative model is stored at the client computing device 10, the maximum token length of content (e.g., text) processable using the generative mode (e.g., one of the ML models 19) may be a first maximum token length (e.g., ≤10,000, ≤20,000, ≤50,000, ≤100,000, etc.). In some implementations, when the generative model is stored at the server device 12, the maximum token length of content (e.g., text) processable using the generative model may be a second maximum token length that is greater than the first maximum token length. The maximum token length can be a maximum number of tokens that is allowed for processing, in a single iteration, using the generative model. In some implementations, the generative model described herein may take various forms, including, but not limited to, model(s) such as Pathways Language Model (PaLM), BERT, Language Model for Dialog Applications (LaMDA), Meena, and/or any other generative model, such as any other generative model that is encoder-only based, decoder-only based, sequence-to-sequence based, MoE-based, and that optionally includes an attention mechanism or other memory, diffusion model(s), etc.

Generative models may have hundreds of millions, or even hundreds of billions of parameters. In some implementations, generative models may include multi-modal models such as a VLM and/or a VQA model, which can have any of the aforementioned architectures, and which can be used to process multiple modalities of data, particularly images and text, and/or images and audio for example, to generate one or more modalities of output. Non-limiting examples of VLMs that may be applied as described herein include Gemini and/or Flamingo, to name a few. In some implementations, the one or more applications installed at the client computing device 10 can additionally, or alternatively, include a social media application, a video player, a search application, a note-taking application, a shopping application, a messaging application, and/or any other appropriate applications (or services) installed at, or accessible via, the client computing device 10.

In various implementations, the server computing device 12 can be, for example, a web server, one or more blade servers acting together to provide "cloud" infrastructure, or any other type of server as needed. In various implementations, the server computing device 12 can include cloud-based components the same as (or similar to) the plurality of local components installed at the client computing device 10.

In some implementations, the server computing device 12 can further include a training instance generation engine 123. The training instance generation engine 123 can be applied to generate training instances to train (or fine-tune) the aforementioned generative model (e.g., one of the ML models 19), and/or to generate instances to train (or fine-tune) the aforementioned reward model. As described above, the generative model can be trained or fine-tuned, e.g., via supervised learning (or via RLHF using the reward model).

In various implementations, the one or more applications can further include a virtual assistant (e.g., a voice assistant 143) that enables human-to-computer dialogues between the virtual assistant and a user of the virtual assistant. In some implementations, the voice assistant 143 can include a plurality of local components. The plurality of local components can include, for instance, an automatic speech recognition (ASR) engine 1431, a text-to-speech (TTS) engine 1433, and/or a response-generation engine 1435. In some implementations, the ASR engine 1431 and/or the TTS engine 1433 may not be included in, but is still accessible by, the voice assistant 143. In some implementations, the voice assistant 143 can include, or otherwise access an audible feature determination engine 1437.

In some implementations, the voice assistant 143 can be installed at the client computing device 10. In some implementations, additionally, or alternatively, the voice assistant 143 can be installed at the server computing device 12 and include one or more cloud-based components. The one or more cloud-based components can include, for instance, a cloud-based ASR engine 1531, a cloud-based TTS engine 1533, a cloud-based response generation engine 1535, and/or a cloud-based audible feature determination engine 1537.

In some implementations, the ASR engine 1431 (and/or the cloud-based ASR engine 1531) can process, using one or more streaming ASR models (e.g., a recurrent neural network (RNN) model, a transformer model, and/or any other type of ML model capable of performing ASR), streams of audio data that capture spoken utterances, to generate corresponding streams of ASR output. The ML model(s) can be on-device ML models that are stored locally at the client computing device 10, remote ML models that are executed remotely from the server computing device (e.g., at remote server device 12), or shared ML models that are accessible to both the client computing device 10 and/or remote systems (e.g., the remote server computing device 12). The audio data can be acquired from audio recordings or can be generated by microphone(s) of the client computing device 10. Notably, the streaming ASR model can be utilized to generate the corresponding streams of ASR output as the streams of audio data are generated.

In some implementations, the corresponding streams of ASR output can include, for example, streams of ASR hypotheses (e.g., term hypotheses and/or transcription hypotheses) that are predicted to correspond to spoken utterance(s) of a user that are captured in the corresponding streams of audio data, one or more corresponding predicted measures (e.g., probabilities, log likelihoods, and/or other values) for each of the ASR hypotheses included in the streams of ASR hypotheses, a plurality of phonemes that are predicted to correspond to spoken utterance(s) of a user that are captured in the corresponding streams of audio data, and/or other ASR output. In some versions of those implementations, the ASR engine 1431 (and/or 1531) can select one or more of the ASR hypotheses as corresponding recognized text ("transcript") that corresponds to the spoken utterance(s) (e.g., selected based on the corresponding predicted measures).

In some of the various implementations, the audible feature determination engine 1437 (and/or 1537) can process audio data to determine audible features associated with the audio data. For example, the audible feature determination engine 1437 (and/or 1537) can process audio data capturing user speech, to generate a spectrogram (e.g., mel-type) reflecting audible features (e.g., SNR ratio, etc.) of the user speech. In some of the various implementations, the cloud-based response-generation engine 1535 can include a gating weight calculation engine 1535A, a routing engine 1535B, and/or an expert output combination engine 1535C (see, e.g., FIG. 1). Additionally, or alternatively, as shown in FIG. 2B, the local response-generation engine 1435 can include a gating weight calculation engine 1435A (the same as or similar to 1535A), a routing engine 1435B (the same as or similar to 1535B), and/or an expert output combination engine 1435C (the same as or similar to 1535C).

The routing engine 1435B (or 1535B) can access, for instance, a gating subnetwork of a ML model (e.g., a generative model), from the one or more ML models 19. In some implementations, the audible features (e.g., a spectrogram) associated with the audio data that captures the user speech can be processed using the gating subnetwork, to generate a gating output reflecting a selection of a subset of expert models, from a plurality of expert models that are included in a Mixture-of-Experts (MoE) subnetwork of the ML model. In implementations, the gating output can be processed (e.g., using the gating weight calculation engine 1435A or 1535A) to further determine a gating weight to be assigned to each expert model in the selected subset of expert models. The routing engine 1435B (or 1535B) can direct input to the MoE subnetwork (e.g., output of the first network layer) to the selected subset of expert models, without directing the input to other non-selected expert models in the MoE subnetwork. The input to the MoE subnetwork can be derived from content of the user speech and/or additional user input (e.g., image, text, etc., if there is any). By directing the input of the MoE subnetwork to the selected subset of expert models instead of all expert models of the MoE subnetwork, excessive consumption of computational resources that is associated with processing of the content (derived from the user speech) can be avoided.

In some implementations, the input to the MoE subnetwork can be processed, respectively, using the selected subset of expert models, to generate one or more corresponding expert outputs. As a non-limiting example, the MoE subnetwork can include a first expert model trained or fine-tuned to process content derived from audio data capturing user speeches that correspond to SNR ratio(s) within a first range (e.g., 0 dB~10 dB), a second expert model trained to process content derived from audio data capturing user speeches that correspond to SNR ratio(s) within a second range (e.g., 8 dB~12 dB), and/or a third expert model trained to process content derived from audio data capturing user speeches that correspond to SNR ratio(s) within a third range (e.g., >12 dB). In this example, optionally, the first expert model can include a first amount of parameters, the second expert model can include a second amount of parameters, and the third expert model can include a third amount of parameters, where the first amount is smaller than the second amount and the second amount is smaller than the third amount. In this example, given audio data capturing a particular user speech that corresponds to a SNR ratio varying from 7 dB to 11 dB, the selected subset of expert models can include, for instance, the first expert model and the second expert model, without including the third expert model.

Continuing with the non-limiting example above, the gating weight calculation engine 1435A (or 1535A) can calculate, based on audible features (e.g., a spectrogram) determined from the given audio data, a first gating weight of approximately 0.2 and a second gating weight of approximately 0.8. The routing engine 1435B (or 1535B) can direct a speech recognition (or a text embedding derived therefrom, or other text representation) of the particular user speech (from the given audio data) to the first expert model and the second expert model, without directing the speech recognition to the third expert model. The routing engine 1435B (or 1535B) can further associate the first gating weight of approximately 0.2 with the first expert model, and associate the second gating weight of approximately 0.2 with the second expert model. In this case, the speech recognition (or the text embedding of the speech recognition) of the particular user speech can be processed, using the first expert model, to generate a first expert output (e.g., a first N-dimensional numeric vector). The speech recognition (or the text embedding of the speech recognition) of the particular user speech can be processed, using the second expert model, to generate a second expert output (e.g., a second N-dimensional numeric vector).

Continuing with the non-limiting example above, the expert output combination engine 1435C (or 1535C) can receive the first expert output from the first expert model, the second expert output from the second expert model, and data from the routing engine 1435B (or 1535B) that indicate an assignment of the first gating weight (e.g., 0.2) to the first expert output and/or an assignment of the second gating weight (e.g., 0.8) to the second expert output. The expert output combination engine 1435C can generate a combined model output based on processing the first expert output in association with the first gating weight of approximately 0.2 and based on processing the second model output in association with the second gating weight of approximately 0.8. For instance, the expert output combination engine 1435C (or 1535C) can multiply the first expert output with the first gating weight of approximately 0.2 to generate a modified first expert output (e.g., in the form of N-dimensional numeric vector), and multiply the second expert output with the second gating weight of approximately 0.8 to generate a modified second expert output (e.g., in the form of N-dimensional numeric vector).

Continuing with the non-limiting example above, the expert output combination engine 1435C (or 1535C) can combine the modified first expert output with the modified second expert output, to generate the combined model output (also referred to as "MoE layer output" or "MoE layer model output", etc.) from which a response responsive to the particular user speech can be derived. By selecting the subset of expert models (e.g., the first and second expert models) from all expert models in the MoE subnetwork based on audible features associated with the particular user speech and by processing the speech recognition of the particular user speech using the selected subset of expert models (instead of all expert models), an accuracy of content included in the generated response can be improved, without consumption of excessive computational resources.

Figure 2A:
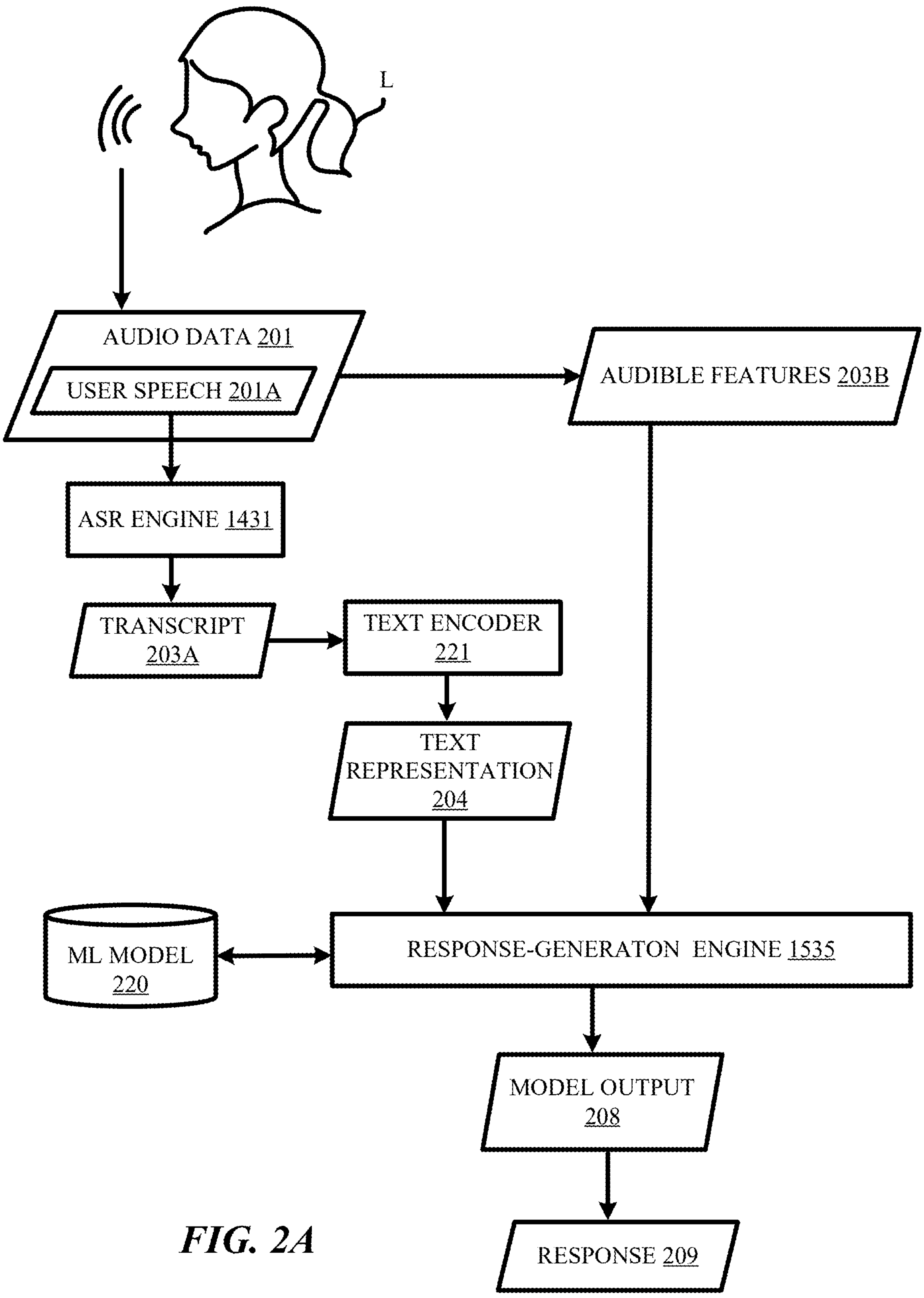
FIG. 2A illustrates a flowchart showing generation of a response for an spoken utterance using techniques described in accordance with various implementations of the present disclosure.
Figure 2B:
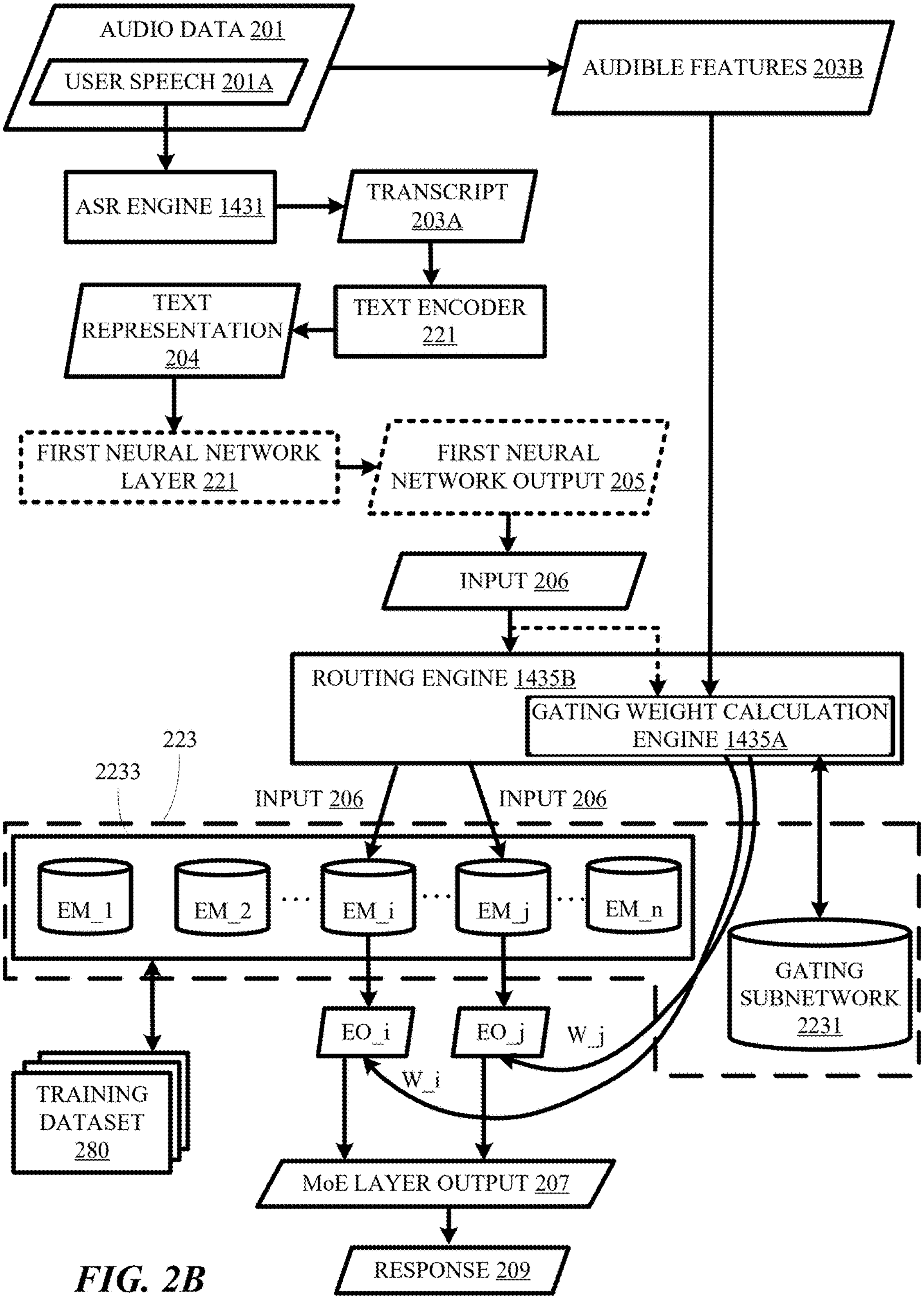
FIG. 2B illustrates selection of a subset of expert models using techniques described in accordance with various implementations of the present disclosure.

FIG. 2A illustrates a flowchart showing generation of a response for a spoken utterance using techniques described in accordance with various implementations of the present disclosure. FIG. 2B illustrates selection of a subset of expert models using techniques described in accordance with various implementations of the present disclosure. As shown in FIG. 2A, audio data 201 capturing user speech 201A of a user (e.g., user L) can be received via one or more microphones of a client device (e.g., 10 in FIG. 1). The audio data 201 can be processed, e.g., using the ASR engine 1431, to generate a transcript 203A (also called "transcription" or "speech recognition") of the user speech 201A. Additionally, or alternatively, the audio data 201 can be processed, e.g., using the audible feature determination engine 1437 (or 1537) to generate audible features 203B (e.g., reflected in one or more spectrograms) of the audio data 201.

In various implementations, referring to FIG. 2A, the transcript 203A and the audible features 203B can be processed by the response-generation engine 1535 (or 1435) using a machine learning (ML) model 220, to generate a model output 208, where the model output 208 can be processed to generate a response 209 for the user speech 201A. The response 209 can be rendered (e.g., audibly and/or visually) in response to the user speech 201A.

In various implementations, referring to FIG. 2B, the ML model 220 can be a generative model (e.g., a multi-layer neural network) having a first neural network layer 221 and a MoE layer 223. The first neural network layer 221 can include, for instance, an attention mechanism (e.g., a multi-head attention mechanism). The MoE layer 223 can include, for instance, a gating subnetwork 2231 and/or a MoE subnetwork 2233. The MoE subnetwork 2233 can include, for instance, multiple expert models (EM_1, EM_2, . . . , EM_n, where "n" is a positive integer greater than "1") each trained (or fine-tuned) using one or more training instances from a training dataset 280. In some implementations, each expert model (of the multiple expert models) can be fine-tuned to process content derived from a respective set of audio data associated with a respective range of signal-to-noise ratios (SNRs). For example, the multiple expert models can include a first expert model EM_1 trained to generate a response for content (e.g., text or text embedding) determined from a recognition of user speeches from audio data associated with a first range of SNRs, a second expert model EM_2 trained to generate a response for content (e.g., text or text embedding) determined from a recognition of user speeches from audio data associated with a second range of SNRs, . . . , and an $n^{th}$ expert model EM_n trained to generate a response for content (e.g., text or text embedding) determined from a recognition of user speeches from audio data associated with an $n^{th}$ range of SNRs, where the first range, second range, . . . , and the $n^{th}$ range can be different from each other.

In some implementations, the transcript 203A of the user speech 201A can be processed, using a text encoder 221, to generate a tokenized text representation 204 (e.g., text embedding in the format of numerical vector) of the transcript 203A. Optionally, the tokenized text representation 204 of the transcript 203A can be processed, for example, using the first neural network layer 221, to generate a first neural network layer output 205. Based on the first neural network layer output 205 and/or the audible features 203B (e.g., one or more spectrograms) of the audio data 201, an input 206 to the MoE layer 223 can be generated.

For example, in some implementations, the input 206 can include the first neural network layer output 205, where the first neural network layer output 205 is determined from the tokenized text representation 204 of the transcript 203A only. Descriptions of the input 206 to the MoE layer 223, however, are not limited herein, and can be varied depending on the specific configuration of the ML model 220. For example, in some implementations, optionally, the first neural network output 205 can be determined based on processing the tokenized text representation 204 of the transcript 203A and/or a tokenized image representation (not illustrated) of a spectrogram representing the audible features 203B of the audio data 201. In some implementations, optionally, the input 206 can include a first portion corresponding to the tokenized text representation 204 of the transcript 203A (of the user speech 201A from the audio data 201) and a second portion corresponding to the tokenized image representation of the spectrogram representing the audible features 203B of the audio data 201. In some implementations, optionally, the input 206 can include a first portion corresponding to the first neural network output 205 derived from the tokenized text representation 204 of the transcript 203A (of the user speech 201A from the audio data 201) and a second portion corresponding to the tokenized image representation of the spectrogram representing the audible features 203B of the audio data 201.

Referring further to FIG. 2B, in some implementations, the routing engine 1435B can select, based on processing the audible features 203B (e.g., one or more spectrograms) of the audio data 201 using the gating subnetwork 2231, a subset of expert models (e.g., EM_i and/or EM_j) from the multiple expert models (EM_1, EM_2, . . . , EM_n). The routing engine 1435B (or the gating weight calculation engine 1435A) can calculate, based on the audible features 203B (e.g., one or more spectrograms) of the audio data 201, a gating weight W_i to be associated with the expert model EM_i and a gating weight W_j to be associated with the expert model EM_j. The routing engine 1435B can direct the input 206 (which is determined based at least from the user speech 201A, or the first portion thereof) to the expert models EM_i and can direct the input 206 (or the second portion thereof) to the expert models EM_j, without directing the input 206 (or any portion thereof) to other expert models (e.g., EM_1, EM_2, etc.). The input 206 (or the first portion thereof) determined at least from content of the user speech 201A can be processed, using the expert model EM_i, to generate an expert output EO_i. The input 206 (or the second portion thereof) determined at least from the content of the user speech 201A can be processed, using the expert model EM_j, to generate an additional expert output EO_j.

The expert output combination engine 1435C can receive the expert output EO_i from the expert model EM_i, the additional expert output EM_j from the expert model EM_j, and the gating weights (i.e., W_i and W_j) from the routing engine 1435B (or the gating weight calculation engine 1435A). The expert output combination engine 1435C can generate a MoE layer output 207 based on processing the expert output EO_i in association with the gating weight W_i and based on processing the expert output EO_j in association with the gating weight W_j. For instance, the expert output combination engine 1435C can multiply the expert output EO_i with the gating weight W_i, multiply the expert output EO_j with the gating weight W_j, and combine the two multiplied results, to generate the MoE layer output 207 from which the response 209 is derived. In some implementations, the MoE layer output 207 (in FIG. 2B) can be the same as the model output 208 (in FIG. 2A). In some other implementations, the MoE layer output 207 (in FIG. 2B) can be different from the model output 208 (in FIG. 2A). For instance, the MoE layer output 207 can be further processed using one or more additional neural network layers (e.g., a second neural network layer), to generate the model output 208 (in FIG. 2A) from which the response 209 is derived.

By loading all the multiple expert models as part of the ML model into memory of a client device or a server device while selecting a subset of the multiple expert models during the inference stage to process the first neural network layer output from the first neural network layer, latency and consumption of resources in generating a response responsive to the user speech/input can be reduced compared to processing the user speech using a different model having the same number of parameters as the ML model disclosed herein. Further, by fine-tuning the multiple expert models to hand processing of input (e.g., tokens) determined from audio data having different ranges of noises (or SNRs) and selecting the subset of multiple expert models to hand an audible user input based on a noise level or a SNR range associated with the audible user input, the accuracy and quality of the response generated in response to the audible user input can be enhanced.

Figure 3A:
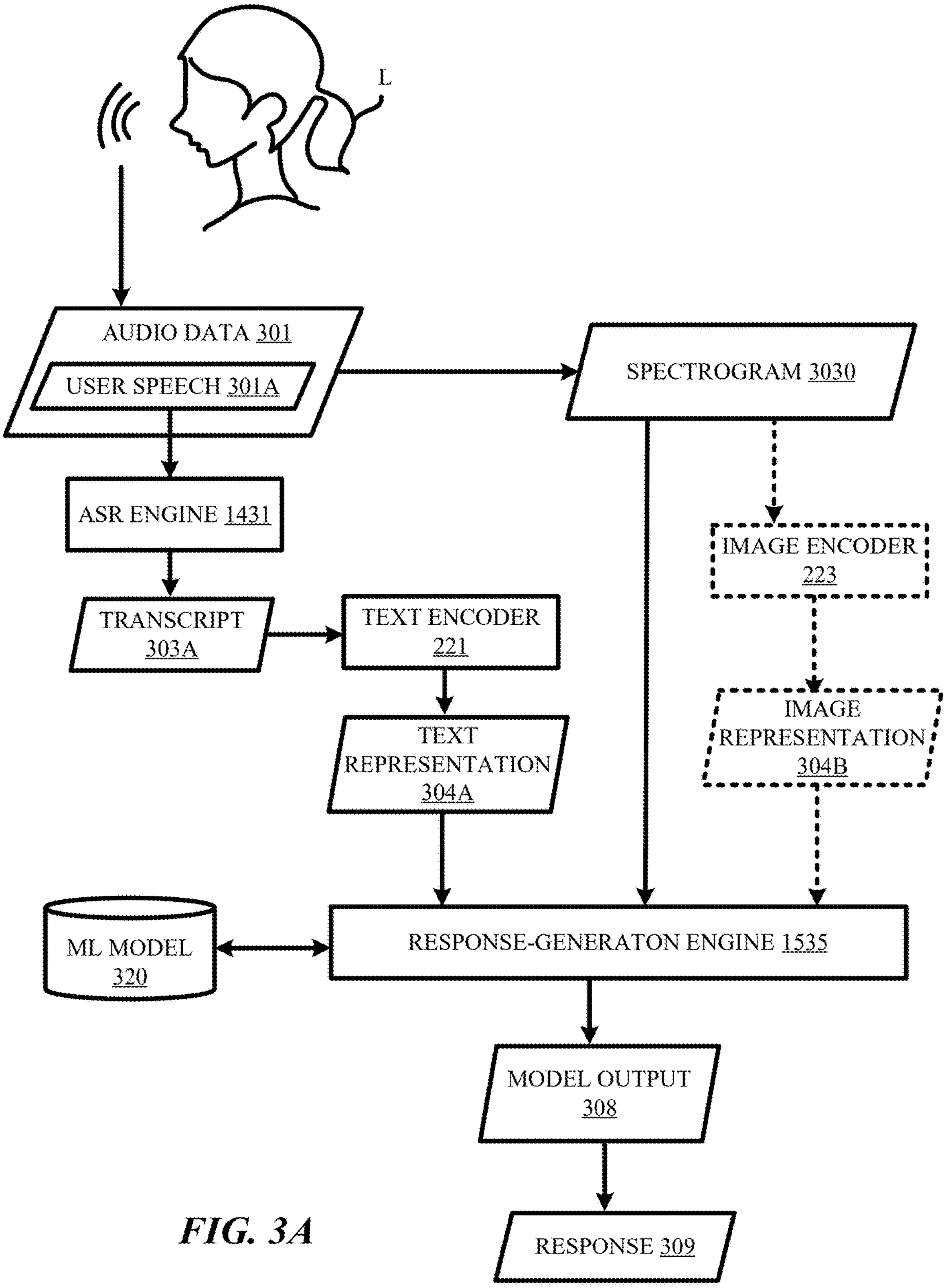
FIG. 3A illustrates another flowchart showing generation of a response for an spoken utterance using techniques described in accordance with various implementations of the present disclosure.
Figure 3B:
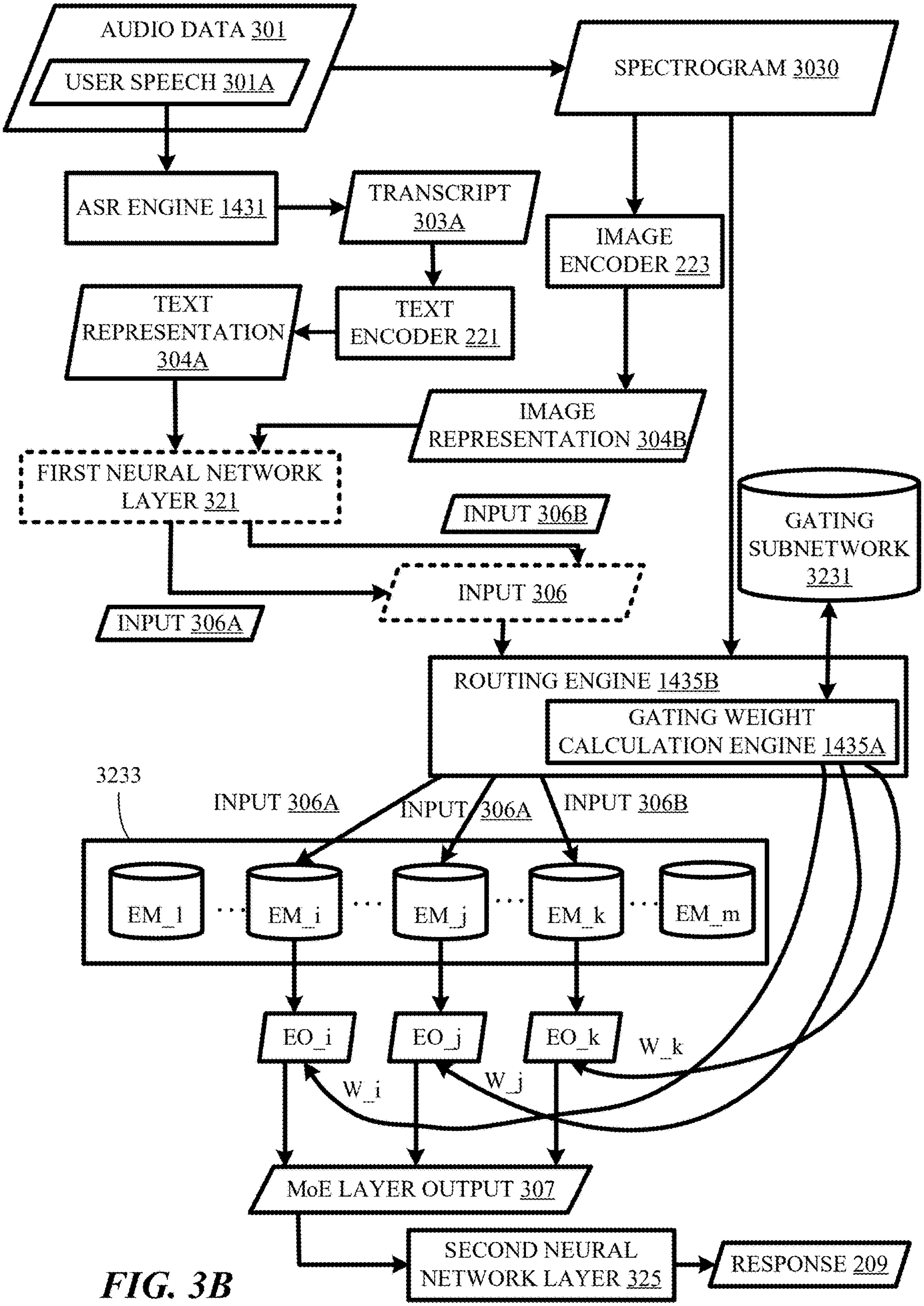
FIG. 3B illustrates selection of a subset of expert models using techniques described in accordance with various implementations of the present disclosure.
Figure 3C:
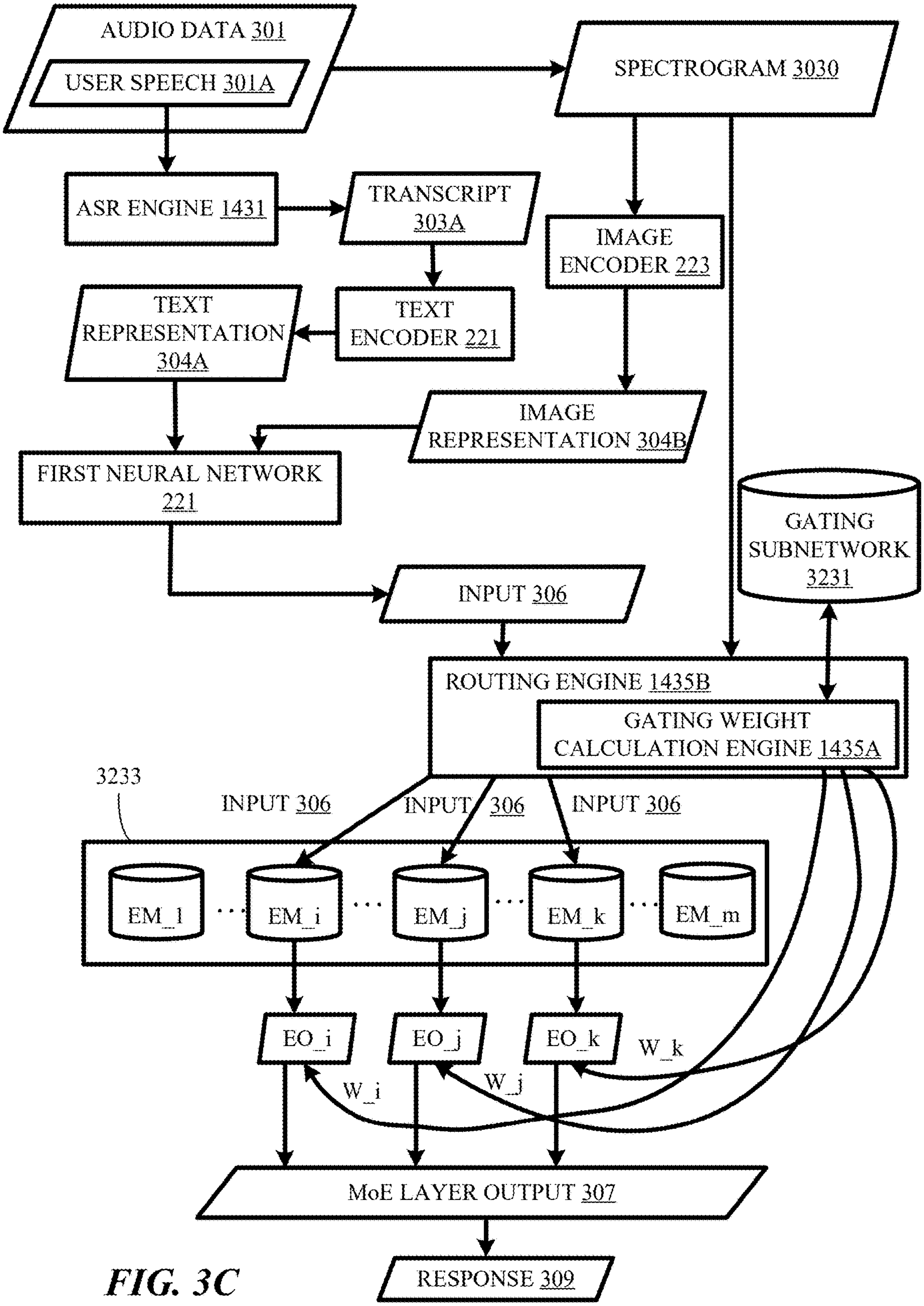
FIG. 3C illustrates alternative processing of a spoken utterance using techniques described in accordance with various implementations of the present disclosure.

FIG. 3A illustrates another flowchart showing generation of a response for a spoken utterance using techniques described in accordance with various implementations of the present disclosure. FIG. 3B illustrates processing of a spoken utterance using techniques described in accordance with various implementations of the present disclosure. FIG. 3C illustrates alternative processing of a spoken utterance using techniques described in accordance with various implementations of the present disclosure. It is noted that descriptions of FIG. 3A~3C that are similar to descriptions in FIG. 2A and FIG. 2B may be omitted for the sake of brevity.

As shown in FIG. 3A, audio data 301 capturing user speech 301A can be received via one or more microphones of a client device. The audio data 301 can be processed, e.g., using the ASR engine 1431, to generate a transcript 303A (also called "transcription" or "speech recognition") of the user speech 301A. Additionally, or alternatively, the audio data 301 can be processed to generate a spectrogram 3030 for the audio data 301.

In various implementations, the transcript 303A (or a tokenized text representation 304A thereof) and the spectrogram 3030 (or an image representation 304B thereof determining using an image encoder 223) can be processed by the response-generation engine 1535 using a machine learning (ML) model 320, to generate a model output 308, where the model output 308 can be processed to generate a response 309 for the user speech 301A. The response 309 can be rendered (e.g., audibly and/or visually) in response to the user speech 301A.

In various implementations, referring to FIG. 3B, the ML model 320 can include a first neural network layer 321 and a MoE layer (e.g., connected to the first neural network layer 321). The first neural network layer 321 can include, for instance, an attention mechanism (e.g., a multi-head attention mechanism). Optionally, the first neural network layer 321 can further include a connection layer and a normalization layer (collectively referred to as "add&norm layer"). The MoE layer can include, for instance, a gating subnetwork 3231 and/or a MoE subnetwork 3233. Optionally, the ML model 320 can further include a second neural network layer 325 connected to the MoE layer, where the second neural network layer 325 can include a multi-head attention mechanism and/or an add&norm layer.

In various implementations, the MoE subnetwork 3233 can include, for instance, multiple expert models (EM_1, EM_2, . . . , EM_m) each trained (or fine-tuned) using one or more training instances, where "m" is a positive integer greater than "1". In various implementations, the value of "m" can be 8, 16, or over 100, and is not limited to descriptions herein. In some implementations, the transcript 303A of the user speech 301A can be processed, using the text encoder 221, to generate a tokenized text representation 304A (shortly as "text representation 304A") of the transcript 303A. The text representation 304A of the transcript 303A can be processed, using the first neural network layer 221, to generate an output (which can be used as input 306A to be processed using the MoE layer 323). In some implementations, a tokenized image representation 304B (shortly as "image representation 304B", e.g., an image embedding in the format of numerical vector) can be generated for the spectrogram 3030 based on processing the spectrogram 3030 using the image encoder 223. The image representation 304B of the spectrogram 303 can be processed, using the first neural network layer 221, to generate an additional output (which can be used as input 306B to be processed using the MoE layer 323). In some implementations, optionally, the image encoder 223 and the text encoder 221 can be trained or fine-tuned so that the text representation 304A and the image representation 304B are numerical vectors in the same latent space and/or having the same length, but this is not required. Optionally, an input 306 can be generated based on the input 306A and the input 306B, but this is not required.

In some implementations, further referring to FIG. 3B, the routing engine 1435B can select, based on processing the spectrogram 3030 of the audio data 301 using the gating subnetwork 3231, a subset of expert models (e.g., EM_i, EM_j, and/or EM_k) from the multiple expert models (EM_1, EM_2, . . . , EM_m). The gating weight calculation engine 1435A can be part of the routing engine 1435B and can calculate, based on processing the spectrograms 3030 of the audio data 301, a gating weight W_i to be associated with the expert model EM_i, a gating weight W_j to be associated with the expert model EM_j, and a gating weight W_k to be associated with the expert model EM_k.

In some implementations, the routing engine 1435B can direct the input 306A (determined from the text representation 304A of the user speech 301A) to the expert models EM_i and EM_j, respectively, and can direct the input 306B (determined from the image representation 304B of the spectrogram 3030) to the expert model EM_k. In this case, the expert models EM_i and EM_j can each be a text-specific model fine-tuned to process tokenized text representations, and the expert model EM_k can be an image-specific model fine-tuned to process tokenized image representations. In some other implementations, referring to FIG. 3C, instead of the input 306A and/or the input 306B, the routing engine 1435B can direct the input 306 (e.g., determined by combining the text representation 304A and the image representation 304B, or by combining the input 306A and/or the input 306B) to the expert models EM_i, EM_j, and EM_k, respectively.

The input 306A (or, in some cases, the input 306) determined at least from content of the user speech 301A can be processed, using the expert model EM_i, to generate an expert output EO_i. The input 306A (or, in some cases, the input 306) determined at least from the content of the user speech 301A can be processed, using the expert model EM_j, to generate an expert output EO_j. The input 306B (or, in some cases, the input 306) determined from the spectrogram 3030 of the user speech 301A can be processed, using the expert model EM_k, to generate an expert output EO_k.

The expert output combination engine 1435C (not illustrated in FIG. 3B) can receive the expert output EO_i from the expert model EM_i, receive the expert output EM_j from the expert model EM_j, and receive the expert output EM_k from the expert model EM_k. The expert output combination engine 1435C can further receive the gating weights (i.e., W_i, W_j, and W_k) from the gating weight calculation engine 1435A. The expert output combination engine 1435C can generate a MoE layer output 307 based on processing the expert output EO_i in association with the gating weight W_i, based on processing the expert output EO_j in association with the gating weight W_j, and based on processing the expert output EO_k in association with the gating weight W_k. For instance, the expert output combination engine 1435C can multiply the expert output EO_i with the gating weight W_i to generate a first numerical vector (also referred to as "first multiplied result"), multiply the expert output EO_j with the gating weight W_j to generate a second numerical vector ("second multiplied result"), and multiply the expert output EO_k with the gating weight W_k to generate a third numerical vector ("third multiplied result").

The expert output combination engine 1435C can combine the first, second, and third multiplied results (e.g., the first numerical vector, the second numerical vector, and the third numerical vector), to generate the MoE layer output 307. The MoE layer output 307 can be processed to determine a response 309 responsive to the user speech 301A. For example, the MoE layer output 307 can be processed using one or more additional neural network layers (e.g., the second neural network layer 325), to generate the response 309. The response 309 can be rendered audibly or visually in response to the user speech 301A.

Figure 4:
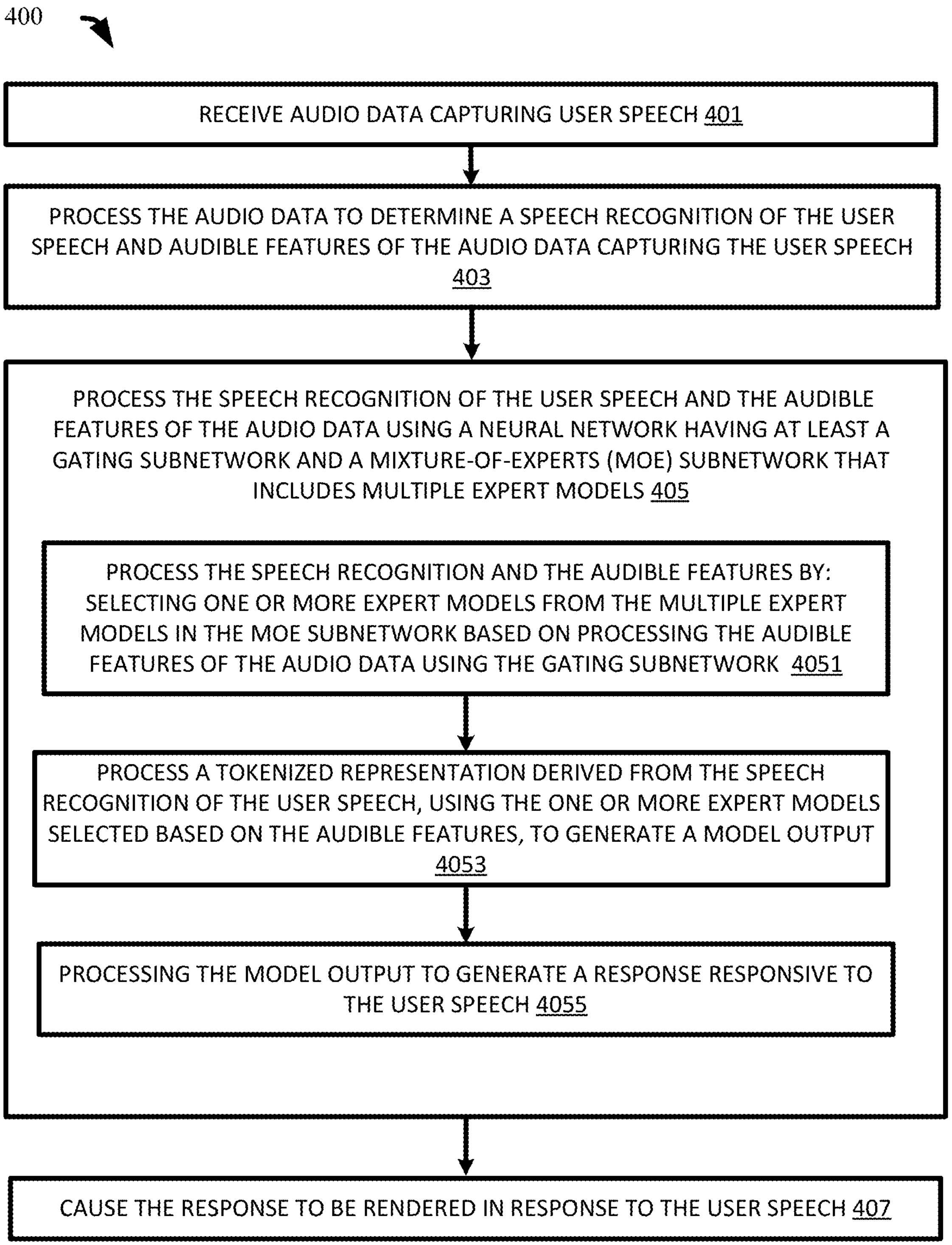
FIG. 4 depicts an example of a method for generating a response in accordance with various aspects of the present disclosure.

Turning now to FIG. 4, a flowchart illustrating a method for generating a response, in accordance with various aspects of the present disclosure. A system for performing the method 400 includes one or more processors, memory, and/or other component(s) of computing device(s) (e.g., the client computing device 10 of FIG. 1, one or more servers such as the server computing device 12, and/or other computing devices). Moreover, while operations of the method 400 are shown in a particular order, this is not meant to be limiting. One or more operations may be reordered, omitted, and/or added.

In various implementations, at block 401, the system receives audio data capturing user speech. The user speech can be captured, for instance, in a noisy environment where the audio data is associated with a particular range of signal-to-noise (SNR) ratios (e.g., 20-30 dB). It is noted that there may be other reasons causing the SNR ratio(s) of the audio data to be relatively low, such as a user of the user speech is far away from one or more microphones of a client device that captures the audio data.

In various implementations, at block 403, the system processes the audio data to determine a speech recognition of the user speech and audible features of the audio data capturing the user speech. In some implementations, the speech recognition of the user speech can be determined based on processing the audio data using an automatic speech recognition (ASR) engine. In some implementations, the audible features of the audio data can be reflected in a spectrogram determined from the audio data. It is noted that, the speech recognition of the user speech can be inaccurate in a noisy environment or other environment that result in relatively low SNR ratio(s) for the audio data that captures the user speech. As a result, there is a need to improve or ensure accuracy of the content generated using system(s) disclosed herein (or elsewhere of this disclosure), in response to the user speech.

In various implementations, at block 405, the system processes the speech recognition of the user speech and the audible features of the audio data using a machine learning (ML) model (e.g., a neural network) having at least a gating subnetwork and/or a mixture-of-experts (MoE) subnetwork. The gating subnetwork and the MoE subnetwork can be collectively referred to as "MoE layer". In some of the various implementations, the neural network can be a multi-layer neural network including a first neural network and the MoE layer connected to the first neural network. In some of the various implementations, the neural network can further include a second neural network connected to the MoE layer.

In some of the various implementations, the MoE subnetwork can include multiple expert models, where different expert models can have different amounts of parameters. As a non-limiting example, the multiple expert models can include a first expert model that has a first amount of parameters and that is trained to generate responses for content determined from audio data having a first range of SNRs (e.g., 10-25 dB), a second expert model that has a second amount of parameters and that is trained to generate responses for content determined from audio data having a second range of SNRs (e.g., 25-45 dB), a third expert model that has a third amount of parameters and that is trained to generate responses for content determined from audio data having a third range of SNRs (e.g., 45-65 dB), and/or a fourth expert model that has a fourth amount of parameters and that is trained to generate responses for content determined from audio data having a fourth range of SNRs (e.g., 65-90 dB). In this non-limiting example, the first amount can be greater than the second amount, the second amount can be greater than the third amount, and the third amount can be greater than the fourth amount.

In some of the various implementations, the system processes the speech recognition and the audible features by: selecting a subset of expert models from the multiple expert models in the MoE subnetwork based at least on processing the audible features of the audio data using the gating subnetwork (block 4051); processing a tokenized representation derived from the speech recognition of the user speech, using the subset of expert models selected based on the audible features, to generate a model output (block 4053); and processing the model output to generate a response responsive to the user speech (block 4055). The model output here is sometimes referred to as "MoE layer output" or "MoE layer model output". In some implementations, the model output (e.g., the MoE layer output) can be processed using one or more neural network layers (e.g., the second neural network layer), to generate the response responsive to the user speech.

In various implementations, at block 407, the system causes the response to be rendered in response to the user speech. The response can be rendered audibly via one or more speakers, and/or can be rendered visually via a display.

In some of the various implementations, the system processes the audio data to determine a speech recognition of the user speech and audible features of the audio data capturing the user speech by: processing the audio data, using an automatic speech recognition (ASR) engine, to determine the speech recognition of the user speech; and processing the audio data to generate a spectrogram reflecting the audible features of the audio data.

In some of the various implementations, the audible features of the audio data reflect signal-to-noise ratio(s) for the audio data. For example, the audible features of the audio data can be determined from a spectrogram for the audio data, where the spectrogram indicates that the audio data is associated with a particular range of SNR ratios (e.g., 20-30 dB) that indicate a relatively low signal.

In some of the various implementations, the gating subnetwork is trained or fine-tuned to select the subset of expert models (from the multiple expert models) based on the audible features (e.g., a signal-to-noise ratio, or a range of signal-to-noise ratios). As described previously, the multiple expert models can be used to respectively process content (e.g., text or tokenized representation of the text) derived from audio data having different ranges of SNRs.

In some of the various implementations, the system processes the speech recognition of the user speech and the audible features of the audio data using the neural network further by: calculating one or more gating weights based on processing the audible features of the audio data using the gating subnetwork.

In some of the various implementations, the system processes the tokenized representation (see block 4053) by: processing the tokenized representation derived from the speech recognition of the user speech, using the selected subset of expert models, respectively to generate one or more corresponding expert outputs; and determining the model output based on the one or more calculated gating weights and the one or more expert outputs.

Continuing with the non-limiting example described previously where the audio data capturing the user speech is associated with a SNR range of approximately 20-30 dB), the selected subset of expert models can include the aforementioned first expert model trained or fine-tuned to process content derived from first audio data having a first range of signal-to-noise (SNR) ratios (e.g., 10-25 dB), and the second expert model trained or fine-tuned to process content derived from second audio data having a second range of SNR ratios (e.g., 25-45 dB). The first expert model is different from the second expert model (e.g., having different configurations such as different amounts of parameters), and the first range of SNR ratio is different from the second range of SNR ratio.

In some other implementations, the system can select the first expert model without selecting the second expert model in response to determining, based on the audible features of the audio data, that the audio data (capturing the user speech) having a SNR ratio (or a range of SNR ratios) corresponding to (e.g., within) the first range; and selecting the second expert model without selecting the first expert model in response to determining, based on the audible features of the audio data, that the audio data having a SNR ratio corresponding to (e.g., within) the second range.

In some of the various implementations, the selected subset of expert models include the aforementioned first expert model trained or fine-tuned to process content derived from first audio data having a first range of signal-to-noise (SNR) ratios (e.g., 10-25 dB), and the second expert model trained or fine-tuned to process content derived from second audio data having a second range of SNR ratios (e.g., 25-45 dB). The first expert model is different from the second expert model (e.g., having different configurations such as different amounts of parameters), and the first range of SNR ratio is different from the second range of SNR ratio.

By loading all the multiple expert models as part of the ML model into memory of a client device or a server device while selecting a subset of the multiple expert models during the inference stage to process the first neural network layer output from the first neural network layer, latency and consumption of resources in generating a response responsive to the user speech/input can be reduced compared to processing the user speech using a different model having the same number of parameters as the ML model disclosed herein. Further, by fine-tuning the multiple expert models to hand processing of input (e.g., tokens) determined from audio data having different ranges of noises (or SNRs) and selecting the subset of multiple expert models to hand an audible user input based on a noise level or a SNR range associated with the audible user input, the accuracy and quality of the response generated in response to the audible user input can be enhanced.

Figure 5:
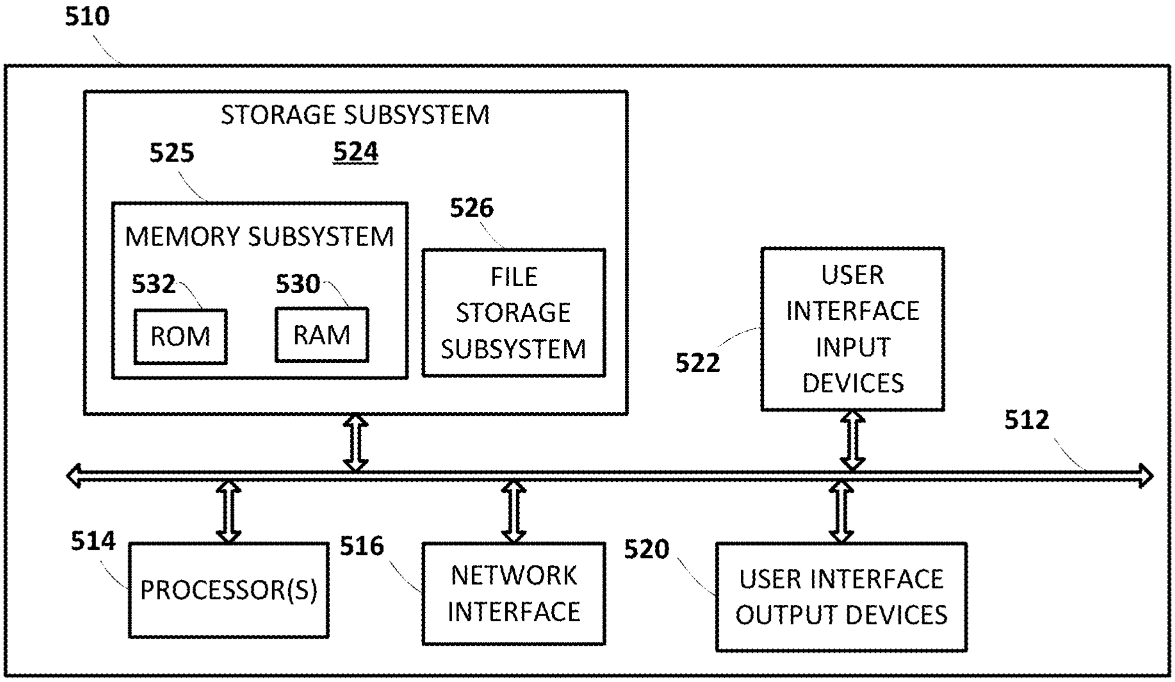
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based LLM-based assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state range), so that a particular geographic location of a user cannot be determined. Thus, the user may have control over how information is collected about the user and/or used.

Some other implementations disclosed herein recognize that training a generative model can require a significant quantity (e.g., millions) of training instances. Due to the significant quantity of training instances needed, many training instances will lack input and/or output properties that are desired when the generative model is deployed for utilization. For example, some training instance outputs for an LLM can be undesirably grammatically incorrect, undesirably too concise, undesirably too robust, etc. Also, for example, some training instance inputs for an LLM can lack desired contextual data such as user attribute(s) associated with the input, conversational history associated with the input, etc. As a result of many of the LLM training instances lacking desired input and/or output properties, the LLM will, after training and when deployed, generate many instances of output that likewise lack the desired output properties.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more transitory or non-transitory computer readable storage media storing computer instructions executable by one or more processors to perform any of the aforementioned methods. Some implementations also include a computer program product including instructions executable by one or more processors to perform any of the aforementioned methods.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

Figure 6:
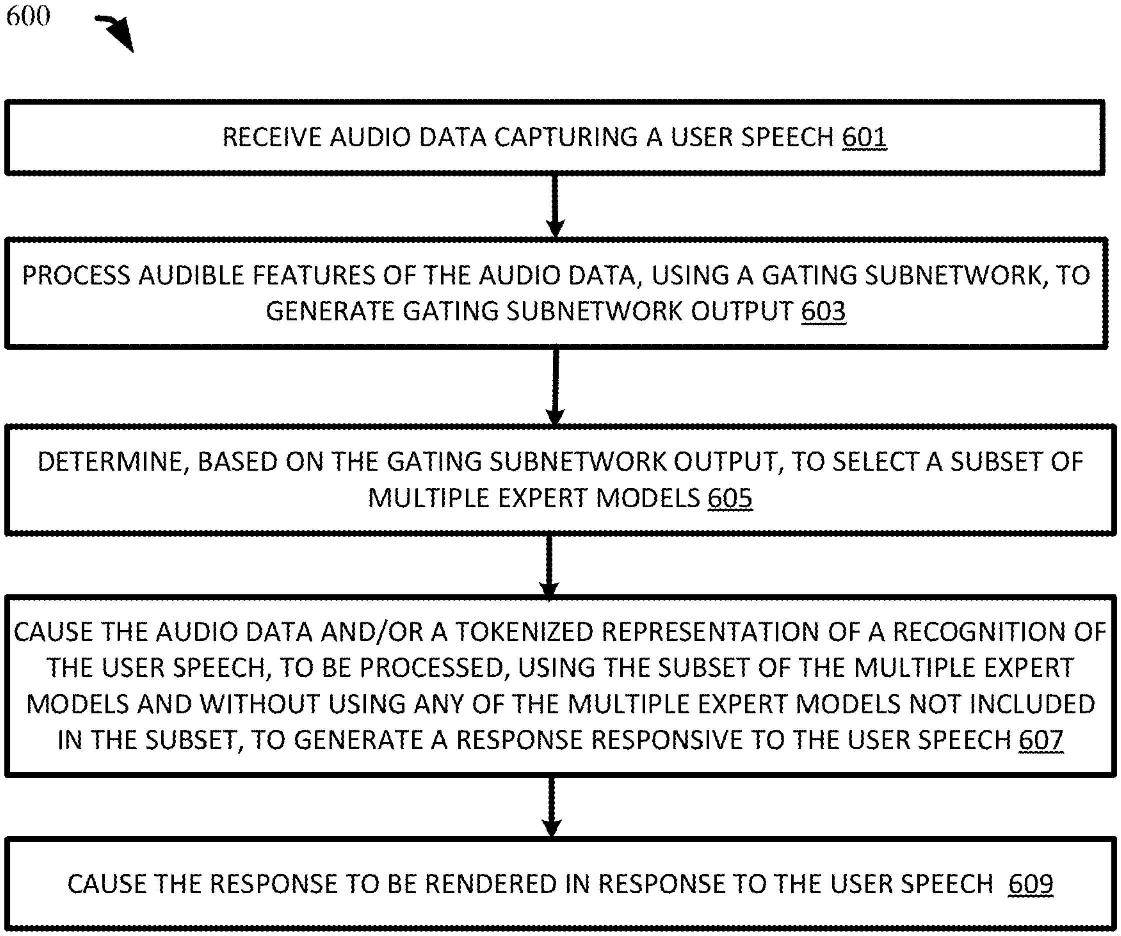
FIG. 6 depicts another example of a method for generating a response in accordance with various aspects of the present disclosure.

For example, referring to FIG. 6, in various implementations, a method 600 implemented using one or more processors is provided. A system for performing the method 600 includes one or more processors, memory, and/or other component(s) of computing device(s) (e.g., the client computing device 10 of FIG. 1, one or more servers such as the server computing device 12, and/or other computing devices). Moreover, while operations of the method 600 are shown in a particular order, this is not meant to be limiting. One or more operations may be reordered, omitted, and/or added.

In various implementations, at block 601, the system receives audio data capturing user speech. In various implementations, at block 603, the system processes audible features, of the audio data, using a gating subnetwork to generate gating subnetwork output. In various implementations, at block 605, the system determines, based on the gating subnetwork output, to select a subset of multiple expert models. In various implementations, at block 607, in response to determining to select the subset of the multiple expert models, the system causes the audio data and/or a tokenized representation of a recognition of the user speech derived from the audio data, to be processed, using the subset of the multiple expert models and without using any of the multiple expert models not included in the subset, to generate a response that is responsive to the user speech. In various implementations, at block 609, the system causes the response to be rendered in response to the user speech.

In some of the various implementations, the gating subnetwork output reflects a corresponding gating weight for each of the multiple expert models. In this case, the system can determine to select the subset of the multiple expert models based on the corresponding gating weights, for the multiple expert models of the subset, satisfying one or more thresholds. In some of the various implementations, the corresponding gating weights, for the selected subset of the multiple expert models, can be utilized in generating the response that is responsive to the user speech.

In some of the various implementations, the audible features include one or more signal-to-noise ratios (SNRs) of the audio data. In some of the various implementations, the gating subnetwork and the multiple expert models form a MoE layer that is included in a single multi-layer neural network. In some of the various implementations, the single multi-layer neural network further includes one or more neural network layers each including a multi-head attention mechanism. Descriptions of the method 600, however, are not limited herein. For example, in some implementations, the system can process content of the user speech, as well as the audible features of the audio data, using the gating subnetwork, to generate the gating subnetwork output that indicates a selection of the subset of expert models. In this case, the subset of expert models can be selected based on a topic of the content of the user speech and/or the SNRs of the audio data capturing the user speech. Different expert models from the multiple expert models can, additionally, or alternatively, be trained or fine-tuned to process content in different topic domains, etc.

What is claimed is:

1. A method implemented using one or more processors, the method comprising:

receiving audio data capturing user speech;

processing the audio data to determine a speech recognition of the user speech and audible features of the audio data capturing the user speech;

processing the speech recognition of the user speech and the audible features of the audio data using a neural network having at least a gating subnetwork and a mixture-of-experts (MoE) subnetwork that includes multiple expert models, wherein the processing comprises:

selecting a subset of expert models from the multiple expert models in the MoE subnetwork based on processing the audible features of the audio data using the gating subnetwork, processing a tokenized representation derived from the speech recognition of the user speech, using the subset of expert models selected based on the audible features, to generate a MoE layer model output, and processing the MoE layer model output to generate a response that is responsive to the user speech; and causing the response to be rendered in response to the user speech.

2. The method of claim 1, wherein processing the audio data to determine a speech recognition of the user speech and audible features of the audio data capturing the user speech comprises:

processing the audio data, using an automatic speech recognition (ASR) engine, to determine the speech recognition of the user speech, and processing the audio data to generate a spectrogram reflecting the audible features of the audio data.

3. The method of claim 1, wherein the audible features of the audio data reflect one or more signal-to-noise ratios for the audio data.

4. The method of claim 3, wherein the gating subnetwork is trained or fine-tuned for use in selecting the subset of expert models based on the one or more signal-to-noise ratios.

5. The method of claim 1, further comprising:

determining one or more gating weights based on processing the audible features of the audio data using the gating subnetwork.

6. The method of claim 5, wherein processing the tokenized representation derived from the speech recognition of the user speech, using the subset of expert models selected based on the audible features, to generate the model output comprises:

processing the tokenized representation derived from the speech recognition of the user speech, respectively, using a respective expert model from the selected subset of expert models, to generate one or more corresponding expert outputs, and determining the MoE layer model output based on the one or more calculated gating weights and the one or more expert outputs.

7. The method of claim 1, wherein the multiple expert models include a first expert model trained or fine-tuned to process content derived from a first set of audio data having a first range of signal-to-noise (SNR) ratios, and a second expert model trained or fine-tuned to process content derived from a second set of audio data having a second range of SNR ratios, wherein the first expert model is different from the second expert model, and wherein the first range of SNR ratios is different from the second range of SNR ratios.

8. The method of claim 7, wherein selecting the subset of expert models from the multiple expert models in the MoE subnetwork based on processing the audible features of the audio data using the gating subnetwork comprises:

selecting the first expert model without selecting the second expert model in response to determining, based on the audible features of the audio data, that the audio data has a SNR ratio corresponding to the first range, and selecting the second expert model without selecting the first expert model in response to determining, based on the audible features of the audio data, that the audio data has a SNR ratio corresponding to the second range.

9. A system, comprising one or more processors and one or more non-transitory computer readable media storing computer-readable instructions that, when executed by the one or more processors, cause the one or more processors to:

receive audio data capturing user speech;

process the audio data to determine a speech recognition of the user speech and audible features of the audio data capturing the user speech;

process the speech recognition of the user speech and the audible features of the audio data using a neural network having at least a gating subnetwork and a mixture-of-experts (MoE) subnetwork that includes multiple expert models, by:

selecting a subset of expert models from the multiple expert models in the MoE subnetwork based on processing the audible features of the audio data using the gating subnetwork, processing a tokenized representation derived from the speech recognition of the user speech, using the subset of expert models selected based on the audible features, to generate a MoE layer model output, and processing the MoE layer model output to generate a response responsive to the user speech; and cause the response to be rendered in response to the user speech.

10. The system of claim 9, wherein the computer-readable instructions, when executed by the one or more processors, cause the one or more processors to process the audio data to determine the speech recognition and the audible features by:

processing the audio data, using an automatic speech recognition (ASR) engine, to determine the speech recognition of the user speech, and processing the audio data to generate a spectrogram reflecting the audible features of the audio data.

11. The system of claim 9, wherein the audible features of the audio data reflect one or more signal-to-noise ratios for the audio data.

12. The system of claim 11, wherein the gating subnetwork is trained or fine-tuned to select the subset of expert models based on the one or more signal-to-noise ratios.

13. The system of claim 9, wherein the computer-readable instructions, when executed by the one or more processors, cause the one or more processors to process the speech recognition and the audible features by:

calculating one or more gating weights based on processing the audible features of the audio data using the gating subnetwork.

14. The system of claim 13, wherein the computer-readable instructions, when executed by the one or more processors, cause the one or more processors to process the tokenized representation by:

processing the tokenized representation derived from the speech recognition of the user speech, respectively, using the selected subset of expert models, to generate one or more corresponding expert outputs, and determining the model output based on the one or more calculated gating weights and the one or more expert outputs.

15. A method implemented using one or more processors, the method comprising:

receiving audio data capturing user speech;

processing audible features, of the audio data, using a gating subnetwork to generate gating subnetwork output;

determining, based on the gating subnetwork output, to select a subset of multiple expert models;

in response to determining to select the subset of the multiple expert models:

causing the audio data and/or a tokenized representation of a recognition of the user speech derived from the audio data, to be processed, using the subset of the multiple expert models and without using any of the multiple expert models not included in the subset, to generate a response that is responsive to the user speech; and causing the response to be rendered in response to the user speech.

16. The method of claim 15, wherein the gating subnetwork output reflects a corresponding gating weight for each of the multiple expert models, and wherein determining, based on the gating subnetwork output, to select the subset of the multiple expert models comprises:

determining to select the subset of the multiple expert models based on the corresponding gating weights, for the multiple expert models of the subset, satisfying one or more thresholds.

17. The method of claim 16, further comprising causing the corresponding gating weights, for selected subset of the multiple expert models, to be utilized in generating the response that is responsive to the user speech.

18. The method of claim 15, wherein the audible features include one or more signal-to-noise ratios (SNRs) of the audio data.

19. The method of claim 15, wherein the gating subnetwork and the multiple expert models form a MoE layer that is included in a single multi-layer neural network.

20. The method of claim 19, wherein the single multi-layer neural network further include one or more neural network layers each including a multi-head attention mechanism.

* * * * *